United States Patent
Osendorf et al.

[11] Patent Number: 5,840,094
[45] Date of Patent: Nov. 24, 1998

[54] AIR FILTER ELEMENT; ASSEMBLY; AND, METHOD

[75] Inventors: Richard J. Osendorf, West St. Paul; Brad Alan Terlson, Maple Grove; Wallace Ronald Saldin, Bloomington; Eugene Joseph Takach, Jr., Eden Prairie; Timothy John Smith, Minneapolis, all of Minn.

[73] Assignees: Donaldson Company, Inc.; Honeywell, Inc., both of Minneapolis, Minn.

[21] Appl. No.: 967,115

[22] Filed: Nov. 12, 1997

Related U.S. Application Data

[63] Continuation of Ser. No. 738,276, Oct. 25, 1996, abandoned, which is a continuation-in-part of Ser. No. 690,549, Jul. 31, 1996, abandoned.

[51] Int. Cl.$^6$ .......................... B01D 46/10; B01D 29/07
[52] U.S. Cl. .................................. 55/497; 55/499; 55/501; 55/502; 55/511; 55/521; 55/DIG. 31; 210/493.3; 210/493.5; 210/509
[58] Field of Search .............................. 55/483, 496–502, 55/511, 521, DIG. 5, DIG. 31; 210/493.1, 493.3, 493.5, 508, 509

[56] References Cited

U.S. PATENT DOCUMENTS

| | | | |
|---|---|---|---|
| 1,899,007 | 2/1933 | Birkholz | 55/521 X |
| 2,058,669 | 10/1936 | Dollinger | 66/521 X |
| 2,081,553 | 5/1937 | Neeson . | |
| 2,135,863 | 11/1938 | Walker | 55/499 |
| 2,415,579 | 2/1947 | Dahlman | 55/521 X |
| 2,915,426 | 12/1959 | Poelman | 55/521 X |
| 2,945,559 | 7/1960 | Buckman | 55/521 X |
| 3,138,443 | 6/1964 | Engle et al. | 55/499 |
| 3,168,917 | 2/1965 | Bartels | 153/1 |
| 3,216,578 | 11/1965 | Wright et al. | 210/484 |
| 3,222,850 | 12/1965 | Hart | 55/521 X |
| 3,292,348 | 12/1966 | Cuta | 55/511 |
| 3,438,180 | 4/1969 | Klouda | 55/126 |
| 3,486,626 | 12/1969 | Close | 55/521 X |
| 3,494,113 | 2/1970 | Kinney | 55/481 |
| 3,606,739 | 9/1971 | Peterson | 55/484 |
| 3,695,012 | 10/1972 | Rolland | 55/499 |
| 3,712,033 | 1/1973 | Gronholz | 55/493 |
| 3,747,773 | 7/1973 | Jackson | 55/DIG. 31 |
| 3,778,985 | 12/1973 | Daigle et al. | 55/497 |
| 3,789,589 | 2/1974 | Delany et al. | 55/497 |
| 3,793,692 | 2/1974 | Tate et al. | 55/501 |
| 3,793,813 | 2/1974 | McAllister | 55/481 |
| 3,823,926 | 7/1974 | Bracich | 55/504 X |
| 3,869,392 | 3/1975 | Wolf | 210/493 |
| 4,042,358 | 8/1977 | Frohmader | 55/497 |
| 4,056,376 | 11/1977 | Schuldenfrei | 55/521 X |
| 4,086,071 | 4/1978 | Champllin | 55/501 |
| 4,133,661 | 1/1979 | Strnad | 55/497 |
| 4,151,095 | 4/1979 | Wright | 210/443 |

(List continued on next page.)

FOREIGN PATENT DOCUMENTS 1073826  3/1980  Canada .

OTHER PUBLICATIONS

Declaration of Richard J. Osendorf with attached Exhibits A–E.

*Primary Examiner*—Robert Spitzer
*Attorney, Agent, or Firm*—Merchant, Gould, Smith, Edell, Welter & Schmidt, P.A.

[57] ABSTRACT

A filter assembly having first and second opposite frame members and a filter element removably secured to the first and second frame members is provided. The filter element is preferably a pleated paper filter, positioned in extension between opposite end panels. An arrangement is provided for securing the end panels to, and in extension between, the first and second opposite frame members. When the arrangement is assembled, an outer frame comprising the two frame members in the two end panels is provided. In the assembly, the pleated filter fills the area within the frame. The filter media can be conveniently removed and replaced in the frame, as desired.

16 Claims, 13 Drawing Sheets

U.S. PATENT DOCUMENTS

| | | | |
|---|---|---|---|
| 4,177,050 | 12/1979 | Culbert et al. | 55/521 X |
| 4,215,079 | 7/1980 | Christophersen et al. | 261/36 R |
| 4,452,619 | 6/1984 | Wright et al. | 55/521 |
| 4,488,888 | 12/1984 | Doyle | 55/481 |
| 4,488,966 | 12/1984 | Schaeffer | 210/485 |
| 4,512,891 | 4/1985 | Wright et al. | 210/445 |
| 4,547,950 | 10/1985 | Thompson | 55/499 |
| 4,584,005 | 4/1986 | Allan et al. | 55/499 |
| 4,615,804 | 10/1986 | Wright | 210/493.1 |
| 4,617,122 | 10/1986 | Kruse et aL. | 210/493.2 |
| 4,701,196 | 10/1987 | Delany | 55/481 |
| 4,724,749 | 2/1988 | Hedrick | 98/31.5 |
| 4,747,341 | 5/1988 | Hedrick | 98/31.5 |
| 4,819,549 | 4/1989 | Gillingham et al. | 98/1 |
| 4,883,513 | 11/1989 | Monson et al. | 55/385.2 |
| 4,946,484 | 8/1990 | Monson et al. | 55/385.2 |
| 4,963,171 | 10/1990 | Osendorf | 55/500 |
| 5,066,400 | 11/1991 | Rocklitz et al. | 210/493.5 |
| 5,133,789 | 7/1992 | Smith | 55/491 |
| 5,183,488 | 2/1993 | Deering | 55/320 |
| 5,236,480 | 8/1993 | Svensson et al. | 55/521 X |
| 5,273,563 | 12/1993 | Pasch et al. | 55/497 |
| 5,273,564 | 12/1993 | Hill | 55/493 |
| 5,290,345 | 3/1994 | Osendorf et al. | 96/129 |
| 5,322,117 | 6/1994 | Guetersloh et al. | 165/166 |
| 5,346,519 | 9/1994 | Williams | 55/500 |
| 5,531,892 | 7/1996 | Duffy | 55/521 X |

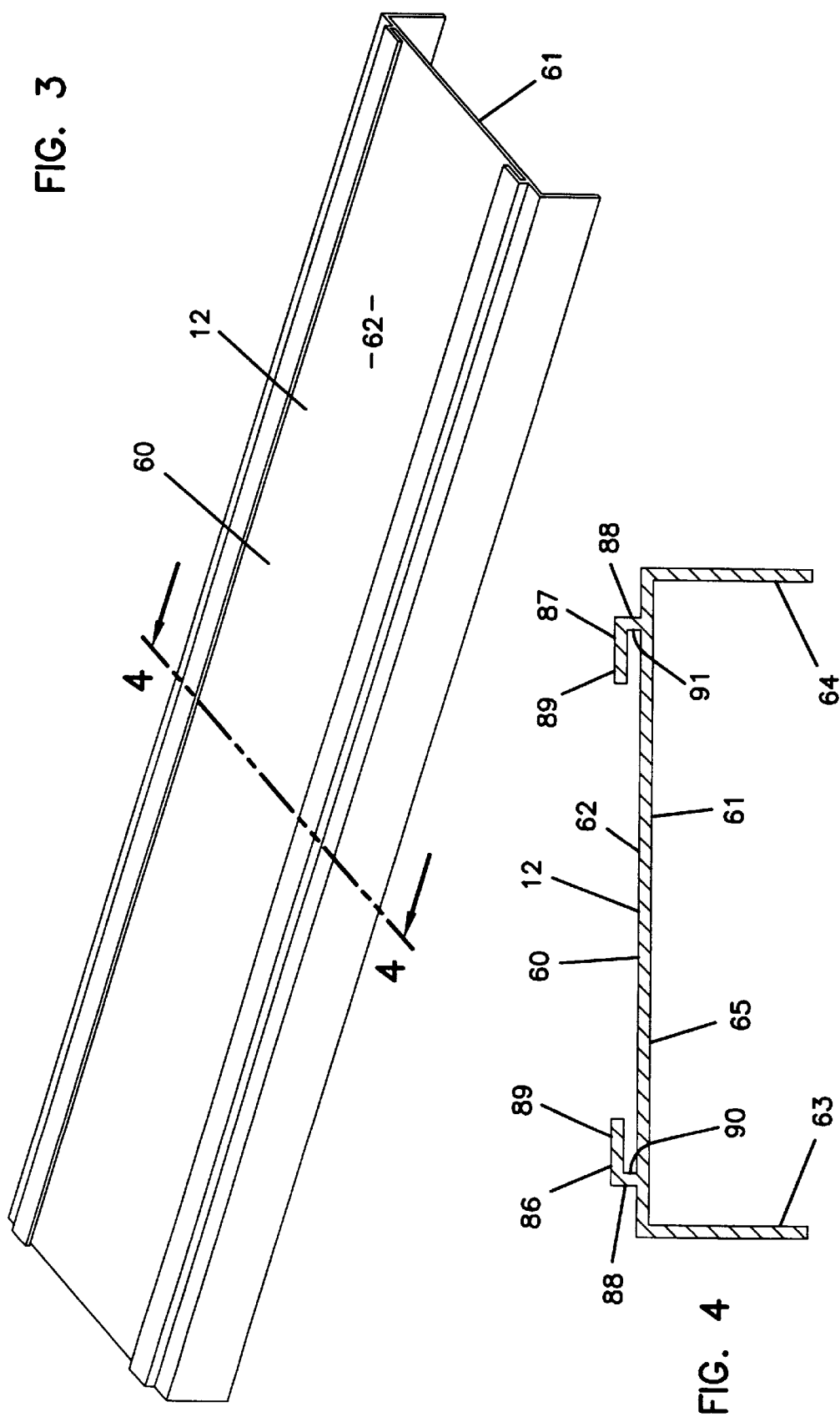

AIR FILTER ELEMENT; ASSEMBLY; AND, METHOD

CROSS-REFERENCE TO RELATED APPLICATIONS

The present application is a continuation of application Ser. No. 08/738,276, filed Oct. 25, 1996, now abandoned. Application Ser.No. 08/738,276 was a continuation-in-part of application Ser. No. 08/690,549, filed Jul. 31, 1996, now abandoned. The complete disclosures of these applications are incorporated herein by reference.

FIELD OF THE INVENTION

The present invention relates to air filter arrangements; and, to components of air filter arrangements. It particularly concerns panel arrangements, methods of assembly, and methods of use.

BACKGROUND OF THE INVENTION

Pleated media filter constructions are used in a wide variety of systems. For example, relatively large panel constructions (typically about 20 inches to 25 inches by 16 inches to 26 inches, i.e., 50.8–63.5 cm by 40.6 to 66 cm) are used to filter intake air for HVAC (heating, ventilation, and air conditioning) equipment in buildings. Smaller panel filters (typically about 6 inches to 12 inches by 3 inches to 12 inches or 15.2 to 30.5 cm by 7.6 to 30.5 cm) are also used as air intake filters and as cabin air filters for vehicles. Herein when dimensions of a filter element are stated as "N1 by N2" or some variant thereof, the first number (N1) refers to width and the second (N2) to height, when the element is stood on edge and with the pleats running vertically.

Some panel systems comprise pleated media positioned within a rectangular frame or framework system. The size of the pleated media outer periphery is generally dictated by the size of the frame.

In some systems, the media and frame construction is designed as a unit, which is disposable after use. That is, for example, the air intake for a room or building air conditioning unit sometimes includes a permanently installed receiver (as part of the installed duct work) into which the panel filter construction (media and frame) can be inserted for use. When the panel filter is loaded with dust sufficiently to be changed, the filter construction (media and frame) can be pulled out of the receiver and discarded, and a new or refurbished filter construction can be slipped into its place.

In some systems, the removable media and frame construction comprises a permanent (i.e., non-disposable) rectangular framework, into which the media is suspended for use. The media and frame construction, again, is typically used by being placed in a receiver that is permanently installed in the building. When it is time to change the filter, the media and frame construction are removed from the receiver, and the rectangular frame construction is "opened" to release the media. A new section of media is placed into the frame, and the frame is reinstalled in the receiver. Systems usable in this manner are described, for example, in U.S. Pat. Nos. 4,042,358; 4,701,196; 5,273,563; and, 5,273,564, the complete disclosures of which are incorporated herein by reference.

SUMMARY OF THE DISCLOSURE

According to certain aspects of the disclosure in 08/690,549, a filter assembly is provided. The filter assembly includes first and second frame members; and, a filter element. The frame members and filter element are constructed and arranged so that the filter element can be removably mounted in the frame members. Thus, when the filter assembly is operably assembled for use, the filter element is positioned in the frame members. After use, when it is time to change the filter element, a used filter element can be dismounted from the frame members, and a new filter element put in its place. The filter elements are preferably constructed so that they can be collapsed, when not mounted on the frame members.

In preferred arrangements, the first and second frame members are opposite, longitudinal, frame members which, in use, will be positioned with the filter element extending therebetween. In preferred constructions the frame members are "separate" from one another; that is, they are not mechanically secured to, or linked to, one another, and there is no construction extending completely between them, except for parts of the removable filter element, during assembly. Thus, they can be removed from the assembly and can be manipulated independently from one another during disassembly.

In typical systems, the filter element will be a pleated media (usually 4 inch to 6 inch deep pleats, i.e., 10 cm to 15.24 cm), and will be positioned in association with the frame members such that the longitudinal extensions of the pleats run "between" the two frame members. By "between" in this context, it is meant that the longitudinal pleats extend generally perpendicularly to the direction of longitudinal extension of the frame members, and thus opposite ends of each pleat are associated with, i.e., are adjacent, opposite ones of the frame members.

In general, the filter element comprises a filter member having: first and second opposite ends; and, first and second opposite end panels. The filter member first end is secured to the first end panel, and, the filter member second end is secured to the second end panel. The filter member, in general, comprises filter media. As indicated above, in preferred systems it comprises pleated media. In some systems, it comprises pleated paper media.

In preferred embodiments, the filter element is secured to the frame members, by operation of the end panels. That is, each end panel includes an engagement arrangement, for attachment to the frame members. In certain preferred assemblies, the engagement arrangement comprises first and second, opposite, end tabs hingedly secured within (or to) each end panel. The frame members, in such an arrangement, are each preferably constructed and arranged to receive an end tab of each panel in a manner securing the filter element to the frame member. In preferred arrangements, each end tab of each end panel is slid into a respective receiving slot on an associated frame member. Thus, in total construction, the preferred arrangements will comprise a rectangular outside border or frame, with two opposite sides of the rectangular border being formed by the frame members; and, with two opposite sides of the rectangular border being formed by the end panels of the filter element. In such preferred arrangements, the end panels are preferably of paperboard or cardboard construction; and, the tabs comprise portions of paperboard (or cardboard) secured to the remainder of the end panel, by hinge folds. The hinge folds, for example, can be generated by die-cuts in the paperboard.

In certain preferred arrangements, for example wherein the end panels are paperboard and the media is pleated, the filter elements can be conveniently collapsed, in accordion-like fashion, when not mounted on the frame members.

Preferably the end panels include side tabs or flaps secured thereto: to provide structural strength; to help protect the media in the collapsed configuration; and, to facilitate assembly.

Preferably each frame member has an elongate central extension, with first and second side surfaces. Preferably each frame member includes first and second opposite side edge members, projecting outwardly from a first side thereof. The edge members, in association with the associated (adjacent) side surface of the frame member, form a receiving trough extending along the longitudinal extension of the frame member. When the filter construction or assembly is assembled with the filter element received therein, an edge portion of the filter element (which comprises one set of ends of the longitudinal pleats) is received within, and extends along, the receiving trough of each frame member. Typically the pleats will extend such that pleat tips, along the upstream side, are spaced about 0.5 inch to 1 inch apart (1.27 cm to 2.54 cm).

Preferably each frame member includes a filter element panel engagement arrangement on the second side thereof, i.e., the side opposite from the trough. As is seen from the drawings, which depict certain preferred frame members, the frame members are preferably configured such that their features can be created during extrusion through a die; with each frame member comprising a longitudinal extension of extrusion, for example plastic or metal, cut to a desired length.

In preferred arrangements, in which the filter assembly comprises pleated media, the assembly includes at least one pleat spacer therein. Each pleat spacer is preferably a spacer or comb, with fingers oriented to project between pleats. Preferably the pleat spacer is positioned on the downstream side of the filter arrangement, oriented centrally between the first and second opposite end edges of the pleats. Preferably each pleat spacer includes a media pinch arrangement therein, for convenient securing to tips of selected pleats.

A preferred media pinch arrangement includes a somewhat S-shaped slot or pincher, generated by two beads, one positioned on each of two adjacent fingers and directed toward one another. Preferably the two beads are offset, longitudinally, in extension along their adjacent fingers, to form the S-shaped slot. If the beads are appropriately sized, and spaced sufficiently close to one another, as a media pleat is pushed into the space between the adjacent fingers, the pleat tip will snake around the S-shaped curve formed by the beads, and be gripped or pinched in position.

It is not necessary that the spacer include a media pincher for association with each pleat; however, typically a plurality of media pinchers will be used for each spacer. Generally, according to 08/690,549, each spacer should include at least 2 and typically 2 to 4 media pinchers. Typically the spacer will include one central pincher. In longer arrangements, two centrally positioned pinchers may be desirable.

Typically, each spacer will have three less fingers, than the total number of pleat spaces on the upstream side of the filter element. A reason for this is that fingers are generally not positioned in the very end spaces, where they would need to be positioned underneath the end flaps of the end panels. This is shown in the drawings. For typical embodiments, each spacer will have about 30 to 46 fingers overall, three less fingers than the number of pleats (typically 33 to 49), to be spaced apart. The preferred spacer comprises a molded plastic spacer. However, alternate materials such as paperboard and cardboard can be used.

Preferred arrangements according to the disclosure of 08/690,549 include pleat bead arrangements therein. As a result, pleat beads operate to secure closed at least a portion of the various pleats, at selected locations, to achieve desirable effects. In general, the pleated media is configured with upstream and downstream pleat tips; and, with each pleat having a first end edge and a second end edge. Also, the media has an upstream side and a downstream side. A pleat bead arrangement generally includes an adhesive positioned to close an associated pleat, at least in part, along opposite end edges of that pleat. Preferably a pair of pleat beads is associated with each upstream pleat tip with a bead positioned at each edge of the media, on the upstream side of the media and spaced at least 0.125 inches (0.32 cm) from the associated upstream tip, and typically 0.25 inch to 1 inch (0.63–2.54 cm) from the associated upstream tip. Preferably the pleat bead, in such arrangements, extends over a distance of about 0.5 inch (1.27 cm) to 1.5 inches (3.81 cm) (typically about 1 inch or 2.54 cm) toward associated, adjacent, downstream tips, from a starting position spaced from an upstream tip. The distance that such beads are positioned from the upstream tip, generates the length of the pleat spacing when the pleated media is expanded. The greater the distance that the bead starts from the upstream tip, the greater will be the pleat spacing along the upstream side of the filter element.

In one embodiment, a set of pleat beads is associated with each upstream tip, on the upstream side of the media, and a set of beads is associated with each downstream pleat tip, on a downstream side of the media. In preferred such arrangements, each pleat bead generally extends over a distance of about 0.5 inch to 1.5 inches (1.27 to 3.81 cm), in longitudinal extension between the pleat tips; and, each bead starts a distance of about 0.25 inch to 1 inch (0.635–2.54 cm), from a nearest associated pleat tip. Pleat beads positioned in this manner, on opposite sides of the filter media and adjacent opposite pleat tips, can be used to form a construction which will tend to spread the media open more efficiently, in use.

In some arrangements, the pleat bead extends from a point spaced about 0.125 to 1.0 inch (0.317 to 2.54 cm) from each associated upstream tip, completely along each pleat edge, to an associated downstream tip.

The various ones of the different pleat bead arrangements described above, can be used to achieve different effects. These are illustrated in the drawings.

Also according to the disclosure of 08/690,549, a preferred filter element is provided, and a preferred spacer is provided. In addition, according to that disclosure methods of construction, assembly and use are provided.

Also according to the disclosure of 08/690,549, kits are provided, which can comprise "knocked-down" arrangements according to that disclosure. A replacement kit would generally comprise a filter element as defined. In some instances, the kit would include at least one spacer included within the package. A kit for assembling a complete filter arrangement according to the disclosure of 08/690,549 would include: first and second frame members; a filter element as defined; and, at least one spacer (typically two spacers). From such a kit, a complete filter assembly, for use in a duct system, could readily be assembled by hand.

Herein, in FIGS. 13–17, certain preferred configurations in accord with the above-stated principles are depicted.

BRIEF DESCRIPTION OF THE DRAWINGS

in FIG. 1, a filter element is depicted mounted on two framework members, to form the filter assembly;

FIG. 3 is a perspective view of a framework member usable with an element according to the disclosure of 08/690,549, to generate an assembly as shown in FIG. 1;

FIG. 4 is a cross-sectional view taken generally along Line 4—4, FIG. 3;

FIG. 6 being taken of the region designated in the circle shown at A, FIG. 5;

in FIG. 12 pleat spacers being depicted;

DETAILED DESCRIPTION

Figure 1:
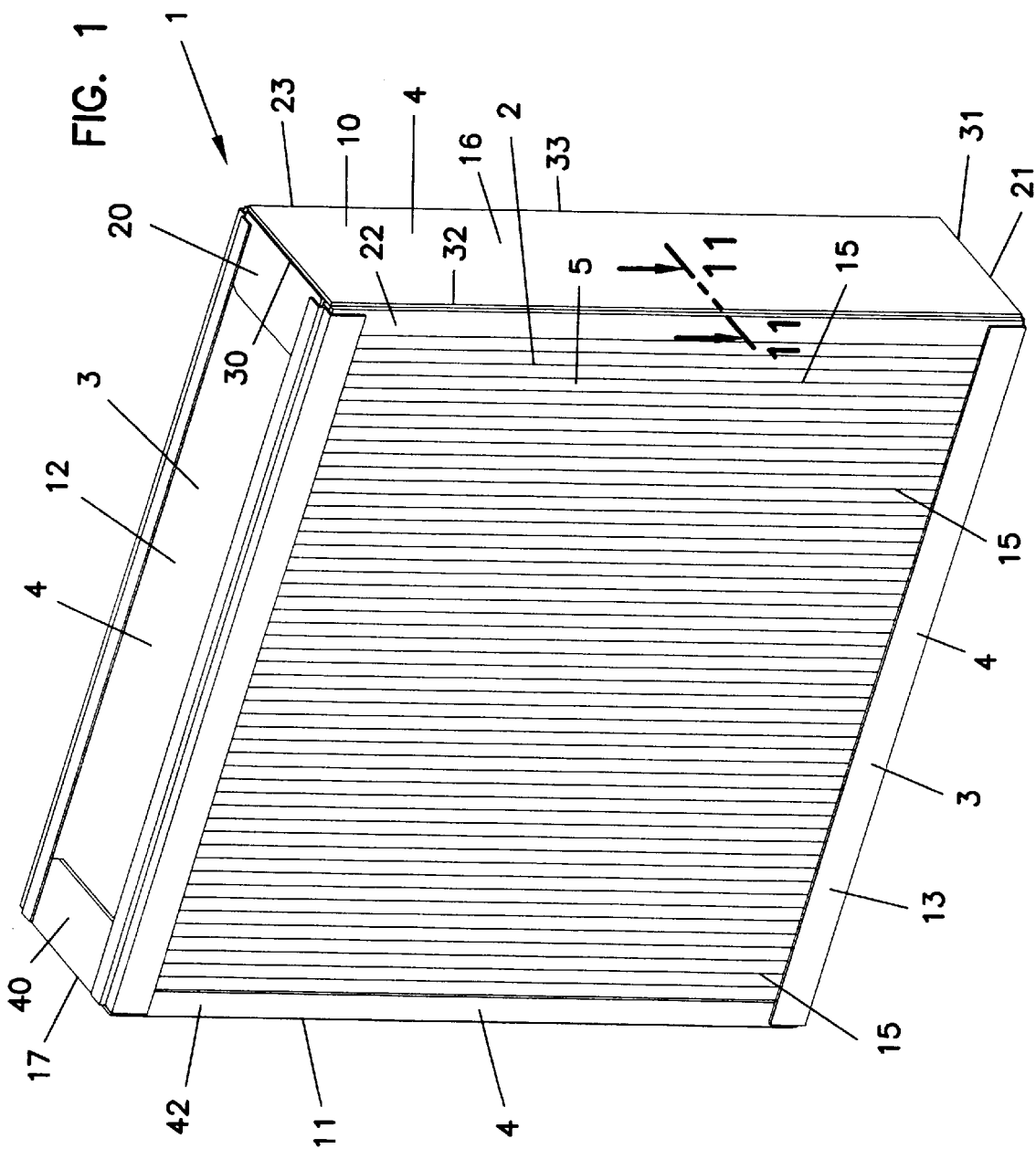
FIG. 1 is a perspective view of a filter assembly or construction according to the 08/690,549 disclosure.

The techniques and principles of the disclosure of 08/690,549 may be applied in a wide variety of air filter systems. For example, they can be used in HVAC systems in buildings, and they can be used in cabin filters for vehicles. In the drawings, applications are described involving an HVAC system. From the descriptions, however, it will be apparent that the principles can be applied in a variety of alternate systems.

HVAC System Including a Filter Arrangement According to the Disclosure of 08/690,549

As explained above, filter arrangements according to the disclosure of 08/690,549 may be used in HVAC arrangements as panel filters. Two typical systems would be: (1) in a Honeywell F25 housing, which is a sheet metal boot positioned in a cold air return and which is configured to receive a variety of designs of filter arrangements; and, (2) to replace media and frame used in Research Products Models 2200 and 2400, which include reusable frames that are removed from duct work, and which include replaceable media therein. In general, the air filter assembly for such arrangements would be about 20 inches to 25 inches by 16 inches to 20 inches (50.8 to 63.5 cm by 40.6 to 50.8 cm), with a pleat depth of about 4 inches to 6 inches (10.1 to 15.24 cm), and a pleat spacing sufficient to have about 1 to 2 pleats per inch (per 2.5 cm), in extension transversely across the filter element.

A filter element for an HVAC system is generally designed to operate with an approach velocity of about 500 feet per minute (152 meters/min.). The external dimensions of the filter element can then be used to provide a definition of typical air flow. For example, a two-foot by two-foot frame of filter media rated at 500 feet per minute can be characterized as providing for an air flow of 2,000 cubic feet per minute (cfm) (2'×2'×500 ft./min.) (0.6096 m×0.6096 m×152 meters/min. or 56.6 cubic meters/min.). A rating of 2,000 cubic feet/min. is typical of HVAC systems, which are generally rated at 1400 to 2000 cfm (39–57 cubic meters/min.).

Certain conventional arrangements are described, for example, in U.S. Pat. Nos. 4,042,358; 4,701,196; 5,273,563; and, 5,273,564, each of which is incorporated herein by reference. In general, such filter arrangements, in use, are releasably secured within an associated framework.

Conventional arrangements such as those depicted in U.S. Pat. Nos. 5,273,564 and 5,273,563, include a filter frame. The filter frame has four interconnected walls. The filter media comprises pleated media which is expanded and is releasably secured within four walls of the frame, to form the framed filter element. The filter element, comprising the plastic frame having the media removably and replacably secured therein, is then slid into, and out of, the permanent duct work and installed frame, as desired, for changing of the filter element.

Certain preferred assemblies according to the disclosure of 08/690,549 were designed and constructed specifically so that they could be used in place of conventional four-walled frame and media. That is, they are constructed and arranged to be used with existing, in place, ductwork, in a desirable manner. Such a preferred filter assembly is depicted in drawings 1–12, and is described in detail hereinbelow. It will be understood, however, that the principles of that disclosure can be applied in a variety of alternate arrangements.

Figure 12:
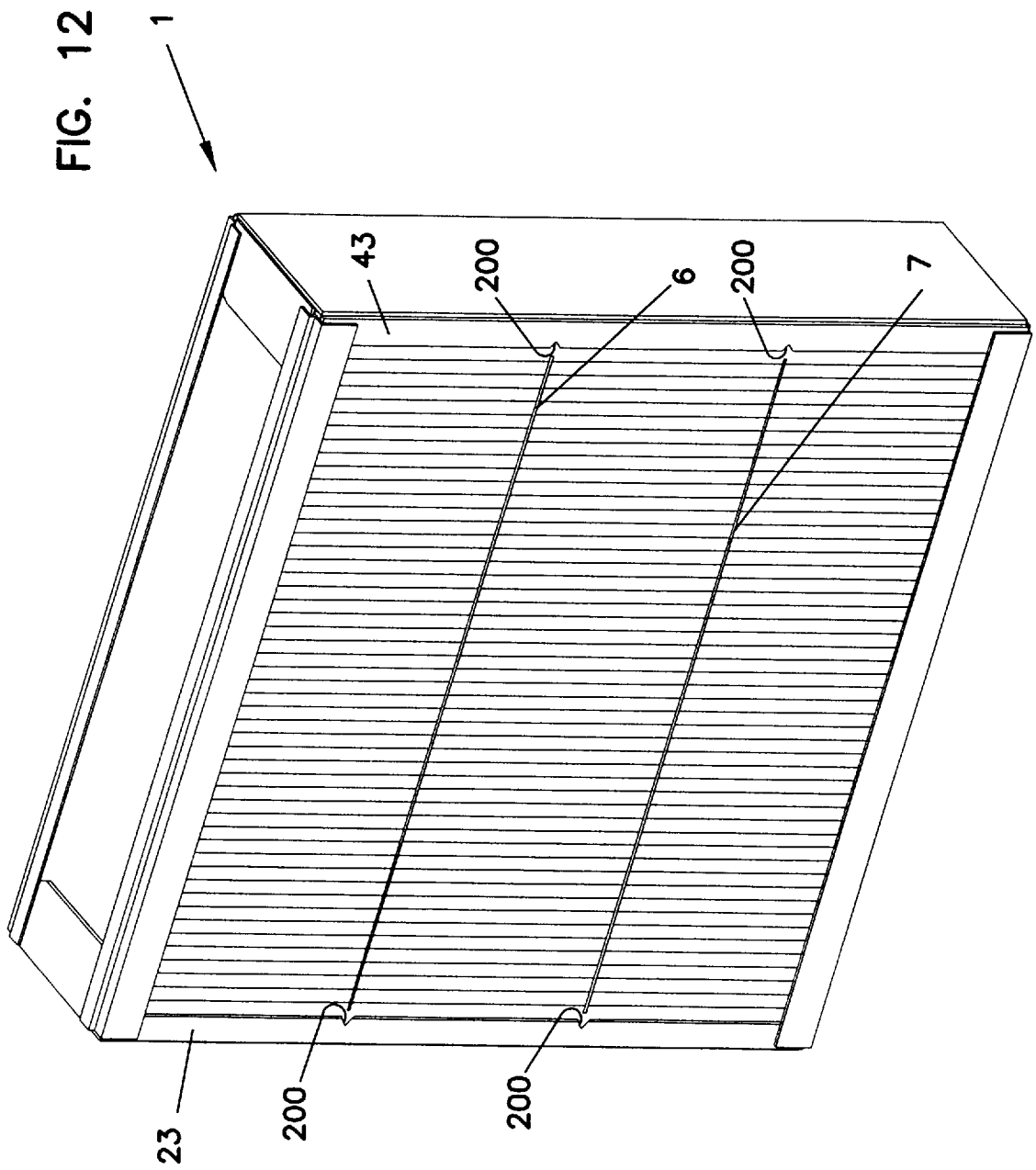
FIG. 12 is an elevational view of a reverse side of the assembly shown in FIG. 1.

Reference numeral 1, FIG. 1, generally depicts a filter assembly according to the disclosure of 08/690,549. Filter assembly 1 is sized in a range to be removably and replacably used in an otherwise conventional HVAC system. In general, the arrangement 1 comprises a filter element 2 and a framework 3. The particular arrangement 1 depicted includes: an outer peripheral frame construction 4; media 5; and, first and second spacers 6 and 7 (FIG. 12). In FIG. 1, a side of the arrangement into which air is directed is shown. In FIG. 12, a reverse side is shown. The spacers 6 and 7 are on the downstream, or clean air, side.

Referring again to FIG. 1, the outer peripheral frame construction 4 comprises: first and second, opposite, panels 10 and 11; and, first and second opposite frame members 12 and 13. As will be further described below, for the particular, preferred, embodiment shown, the media 5 is permanently secured to panels 10 and 11, but the frame members 12 and 13 can be separated from the remainder of the construction 4. Preferably the frame members 12, 13 are "separate" from one another; that is, when not assembled with the filter element 5, the frame members 12, 13 are completely, physically, separate from one another. Thus, part of the outer frame construction 4 is formed from the filter element 2 and part comprises separate frame members 12, 13.

More specifically, the media 5 is preferably a pleated media which is generally secured to, and extends between, panels 10 and 11. That is, individual pleats 15 extend generally parallel to opposite end surfaces 16 and 17 of end panels 10 and 11, respectively; and, opposite ends of the flexible media 5 are physically attached to the panels 10 and 11, for example, by an adhesive or a mechanical connector. For the arrangement shown, typically a hot melt adhesive is used. For the preferred arrangement shown, panels 10, 11 have generally rectangular, central, surfaces, of about the same size as a pleat, and end tabs and side flaps, as described.

Figure 5:
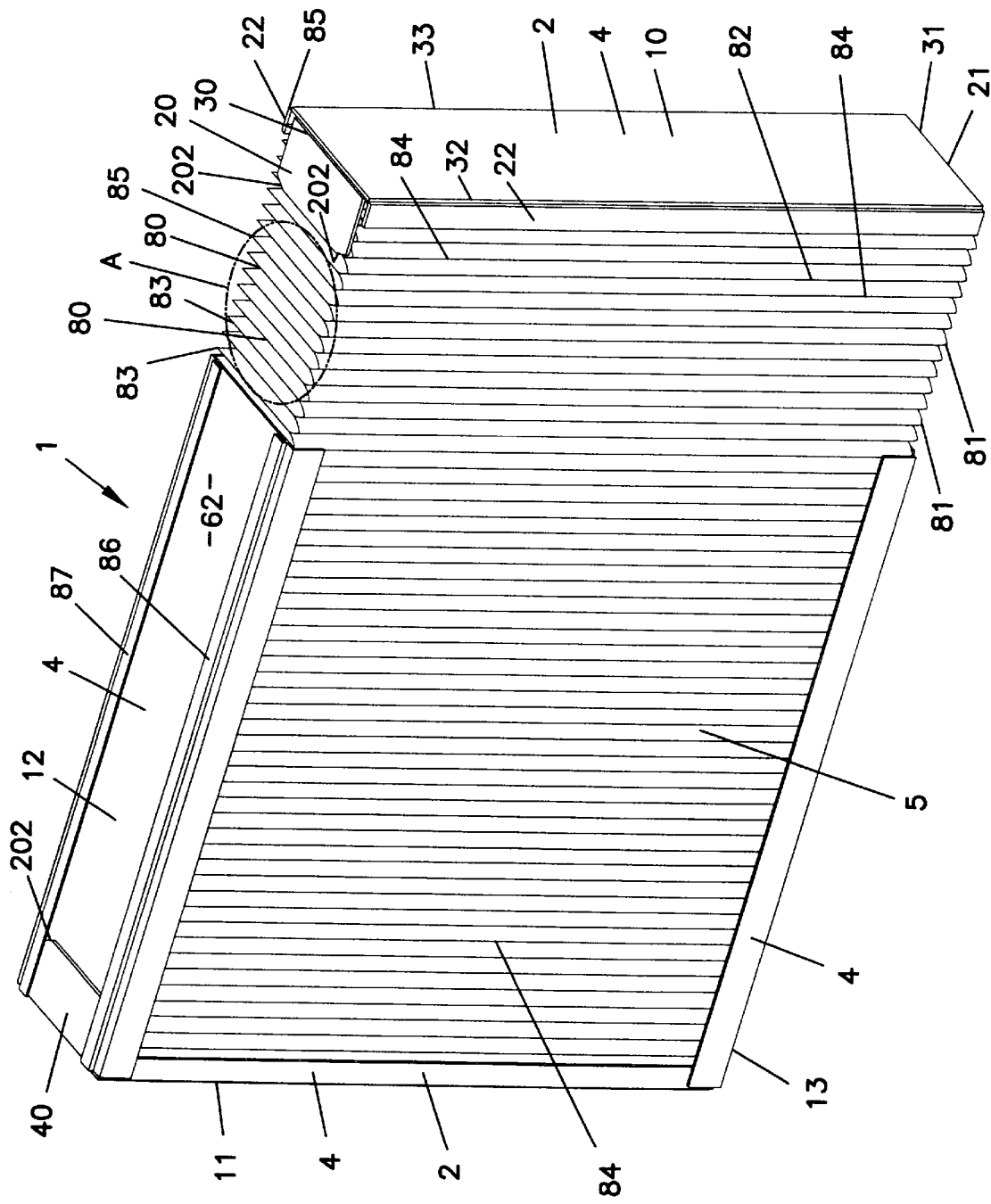
FIG. 5 is an exploded perspective view depicting a step of positioning an expanded filter construction into first and second frame members, to assemble the arrangement of FIG. 1.

More specifically, for the preferred arrangement shown, panel 10 includes, secured therein: first and second end tabs 20 and 21 (FIG. 2); and, first and second side flaps 22 and 23 (FIG. 5). Preferably, tabs 20 and 21 and flaps 22 and 23 are secured to panel 10 along flexible hinge lines or hinge folds. For the arrangement depicted in FIGS. 1 and 2, the hinge folds for tabs 20 and 21 are depicted at 30 and 31, respectively; and the hinge folds for flaps 22 and 23 are depicted at 32 and 33, respectively.

According to 08/690,549, in preferred arrangements, end panel 11 is analogous to end panel 10 and includes, secured therein: first and second opposite tabs 40 and 41 (FIG. 2); and, first and second opposite side flaps 42, 43 (FIGS. 1 and 12). The tabs 40, 41 are hingedly secured in end panel 11. The flaps 42, 43 may be hingedly secured, or they may be fixed by adhesive, FIG. 11. Thus, panels 10 and 11 are preferably identically constructed and are positioned as mirror images of one another.

For the arrangement shown in FIG. 1, the hinge folds are constructed and arranged such that the tabs or flaps of each one of the panels 10, 11 can be folded toward the opposite one of the panels 10, 11 in the filter element 2. This can be understood by reference to FIG. 2.

Figure 2:
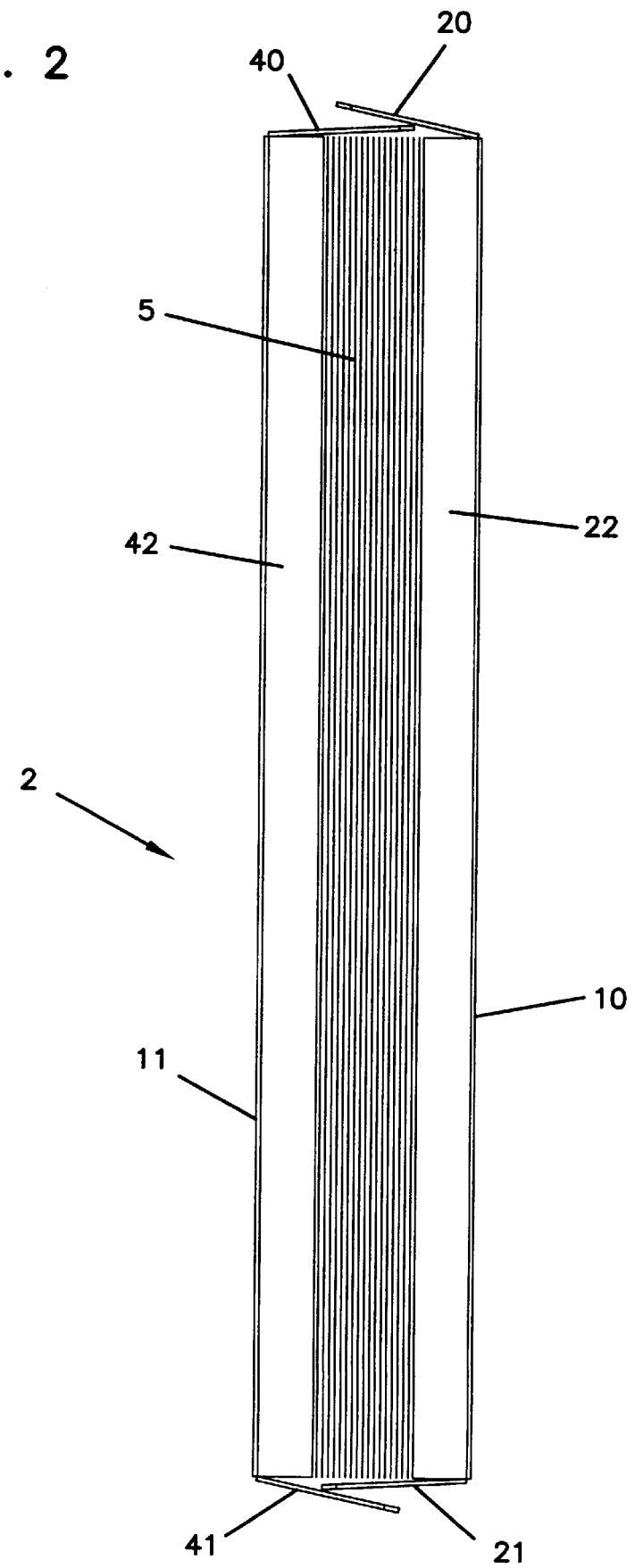
FIG. 2 is a side elevational view of a filter element according to the disclosure of 08/690,549 shown collapsed, prior to expansion and positioning on framework members; the filter element of FIG. 2 being the one depicted in the assembly of FIG. 1.

In FIG. 2, first and second, opposite, end panels 10 and 11 are shown with the media 5 extending therebetween. In FIG. 2, panels 10 and 11 are collapsed toward one another. That is, in an accordion-like (or pleated) manner, the media 5 is folded and collapsed, with panels 10 and 11 moved as close to one another as can be readily done, without damaging the overall filter element 2 depicted, by application of compressive forces thereto. This is the configuration filter elements 2 according to the disclosure of 08/690,549, for preferred embodiments, will have when not assembled for filtering. That is, in FIG. 2, filter element 5 is depicted collapsed, as it would be during storage or disposal. In use, filter element 2 is expanded, as described herein below.

As can be seen from review of FIG. 2, the end tabs (20, 40 and 21, 41) and side flaps (for example 22, 42) of each panel 10, 11 are folded toward the opposite panel 11, 10.

Referring again to FIG. 1, the first and second opposite frame members 12 and 13 comprise the framework 3, and are separable from each other and the remainder of the assembly 1. In typical use, the "remainder" of the assembly 1 will comprise the filter element 2, FIG. 2, which is expandable and collapsible as described. For typical constructions, filter element 2 will be a removable, replaceable, and disposable portion of the assembly 1, whereas frame members 12 and 13 will be reusable parts. Of course, depending on the material chosen, the spacers 6 and 7 can be reusable.

For the preferred arrangement shown, frame members 12 and 13 are generally identical to one another, and are oriented in the overall assembly 1 as mirror images of one another. For this reason, frame member 12, FIGS. 3 and 4, will be described in detail with an understanding that frame member 13 can be the same.

Referring to FIG. 3, frame member 12 comprises a center member 60 having an inside surface 61 and an outside surface 62. For the arrangement shown, the inside surface 61 is bordered on first and second opposite sides by longitudinal side members or edge members 63 and 64. Thus, surface 61 and side members 63, 64 form a trough 65 which receives an end edge of media 5 during assembly, FIG. 1.

Herein the term "end edge" when used in this context to describe pleated media, such as media 5, is meant to refer to an edge along which the various pleats terminate. The pleated media, then, would have two opposite end edges. The end edges would be configured with longitudinal media pleats extending therebetween, and thus would also comprise pleat ends. In FIG. 5, the opposite end edges are depicted at 80, 81. It is noted that the media 5 also has ends which are secured to panels 10, 11. These ends are not end edges as defined above.

Still referring to FIG. 5, the media 5 may be viewed as having an upstream surface 82 (dirty side) and a downstream surface 83 (clean side). In general, it is folded into pleats, with a plurality of upstream pleat tips 84 and a plurality of downstream pleat tips 85. In general, a downstream pleat tip 85 is positioned between two adjacent upstream pleat tips 84, and each upstream pleat tip 84 is positioned between a pair of downstream pleat tips 85, disregarding the ends.

Preferably the frame members 12, 13 are constructed such that the only projections each one has, extending outwardly from inside surface 61, are the two side members 63, 64. That is, preferably the trough 65 is defined by flat surface 61 bordered by side members 63, 64 without other projections therein. This will generally facilitate assembly and use. It is also a construction that can be readily made using extrusion techniques.

Attention is now directed to FIG. 5. In FIG. 5, the arrangement 1 is shown during a step of assembly, for use. In general, during assembly, the frame construction 4 is assembled by securing the filter media 5 in extension between the frame members 12 and 13. For the preferred arrangements shown, the assembly results in a spacing of the frame members 12, 13 apart, and oriented as mirror images of one another, with the filter element 2 positioned therebetween; and, a portion of the filter element 2 defining two opposite sides of the assembly 1. For the preferred embodiment shown, the arrangement is assembled in the following manner.

The filter element 2, shown in its collapsed, non-used configuration in FIG. 2, is expanded as shown in FIG. 5. Tabs 20 and 40 are on aligned ends of panels 10 and 11, respectively, and are slid over surface 62 of the frame member 12. Meanwhile, ends 80 of the media pleats, and ends 85 of flaps 22, 23 are received within the trough 65.

To facilitate assembly, frame member 12 includes, extending from surface 60 thereof, projections 86 and 87. Referring to FIG. 4, each of projections 86 and 87 comprises a rail, and includes an upright member 88 and a lateral extension 89. In combination with surface 62, projections 86 and 87 define receiving slots 90 and 91, under the rails 86, 87, for receipt of tabs 20 and 40, therein. That is, in use tabs 20 and 40 are secured in place by being received under lateral extensions 89 of projections 86 and 87, into slots 90, 91 defined thereby. In a similar manner, frame member 13 is positioned at pleat ends 81 of the element 2.

As a result of the assembly shown in FIG. 5, the arrangement of FIG. 1 is generated, with a rigid outer frame 4, comprising end panels 10, 11 (as a first pair of opposite sides) and frame members 12, 13 (as a second pair of opposite sides). Thus, components 10, 11, 12 and 13 define an outer frame 4 having the media pleats 15 positioned therein. The unit or assembly 2 that results can easily be positioned in permanent frame constructions, for example the duct work of HVAC systems. When a change of media is necessary or desirable, the unit can be readily removed and disassembled. The used or dirty filter media, with its end panels 10 and 11, can readily be slid out of engagement with frame members 12 and 13, and can be replaced by a new, fresh, previously collapsed, media member.

Referring to FIG. 12, in general, to facilitate operation, it is desirable to provide at least one pleat spacer for retaining the pleats 15 in a generally open, and spaced, manner. For the arrangement depicted, two spacers 6 and 7 are shown. Each spacer 6, 7 comprises a generally comb-like construction, for spacing the pleats. With respect to this, attention is directed to FIGS. 9 and 10.

Figure 9:
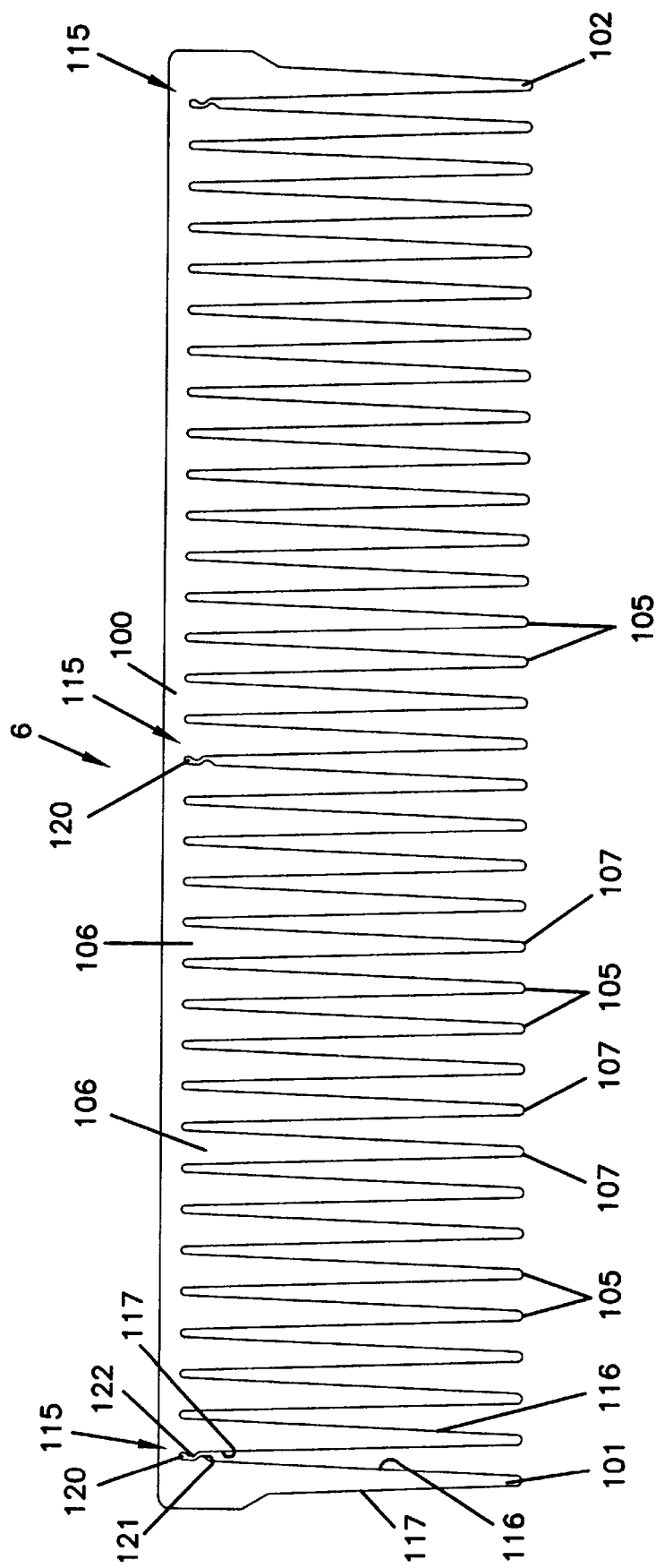
FIG. 9 is a plan view of a spacer, usable with arrangements according to FIG. 1.

Referring to FIG. 9, spacer 6 is depicted in plan view. It will be understood that spacer 7 can be identical.

Spacer 6 comprises a comb-like configuration, with a longitudinal ridge 100 having end fingers 101 and 102, respectively. Projecting outwardly from the longitudinal ridge 100, evenly spaced between end fingers 101 and 102, are central pleat-spacing fingers 105. Each one of fingers 105 tapers from a base region 106 to a tip 107, preferably along generally straight edges, to conveniently project between adjacent pleats and to retain same spread open. Preferably, the spacer 6 is sized and configured to have three less fingers (101, 102 and 105) as the number of spaces between pleats 15, FIG. 1, on the upstream side of the construction 1. That is, the spacers 6 and 7 are typically inserted with the longitudinal ridge 100 extending along the downstream or clean air side of the media, during use; and, with one finger spacing each pleat open, except for the very end pleats on each side.

For the arrangement shown, the spacer 6 does not include a finger projecting into the very end pleats, to spread them open. This is because each end pleat is positioned underneath one of the side flaps 23, 43 of the end panels 10, 11, and positioning the spacer 6 with a portion projecting underneath flaps 23, 43, would bow the flaps outwardly somewhat, an inconvenient construction. It is recognized that alternate constructions, which have a finger in the very end plates, are possible.

Figure 10:
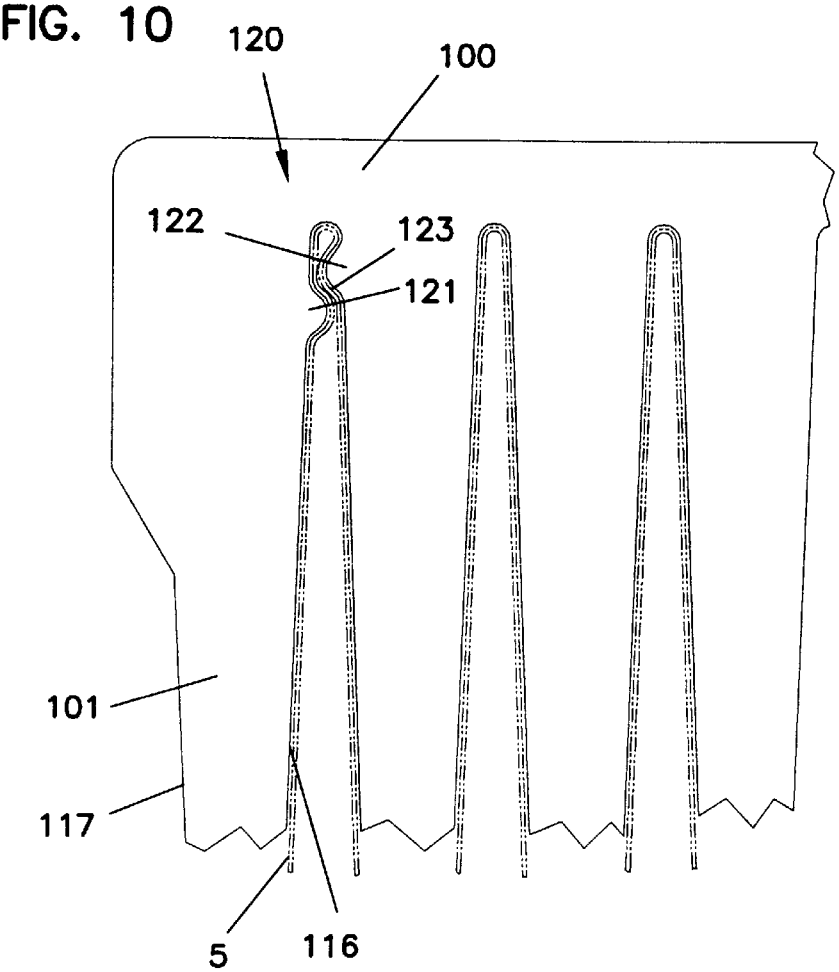
FIG. 10 is an enlarged schematic view depicting engagement between a spacer according to FIG. 9, and a filter construction generally according to FIG. 1.

Referring again to FIG. 9, spacer 6 includes a securing arrangement thereon for securing the spacer 6 to the media pleats. The preferred arrangement for securing generally comprises a convenient media pinch arrangement 115. In particular, each finger 101, 102, 105 is formed from edges 117 and 116. In the region adjacent longitudinal ridge 100, adjacent edges 116, 117 of adjacent fingers, converge towards one another, to form a bite or pinch arrangement 120. Referring to FIG. 10, to facilitate the pinch, a pair of beads 121, 122 are associated with each pinch, longitudinally spaced from one another, along the extended length of the associated fingers, to form a generally S-shaped channel 123. As shown in FIG. 10, when the media 5 is snaked into the channel 123, the opposite beads 121, 122 generally form a bite or nip 120 to capture the media, and secure engagement.

For arrangements about 16 inches to 20 inches long (40.6 to 50.8 cm), generally a media pinch arrangement having at least 2 and typically 2 to 4 media bites or pinchers, for each spacer, are appropriate. In preferred constructions such as those shown, a media pincher or bite is associated with the opposite end fingers, of each spacer; and, one media pincher or bite is positioned in about the middle of the longitudinal extension of the spacer 6. Thus, for such arrangements, a total of 3 media pinchers would be used.

The spacer may be formed from a variety of materials. A molded plastic member, is useful. In some arrangements, a die-cut cardboard or paperboard member may be usable.

A variety of pleat bead arrangements can be used to facilitate the opening of the pleats, during operation, for efficient utilization of the filter media surface area, during filtering. Three different conveniently obtained, pleat bead arrangements, are shown in FIGS. 6, 6A, 7 and 8.

Figure 6:
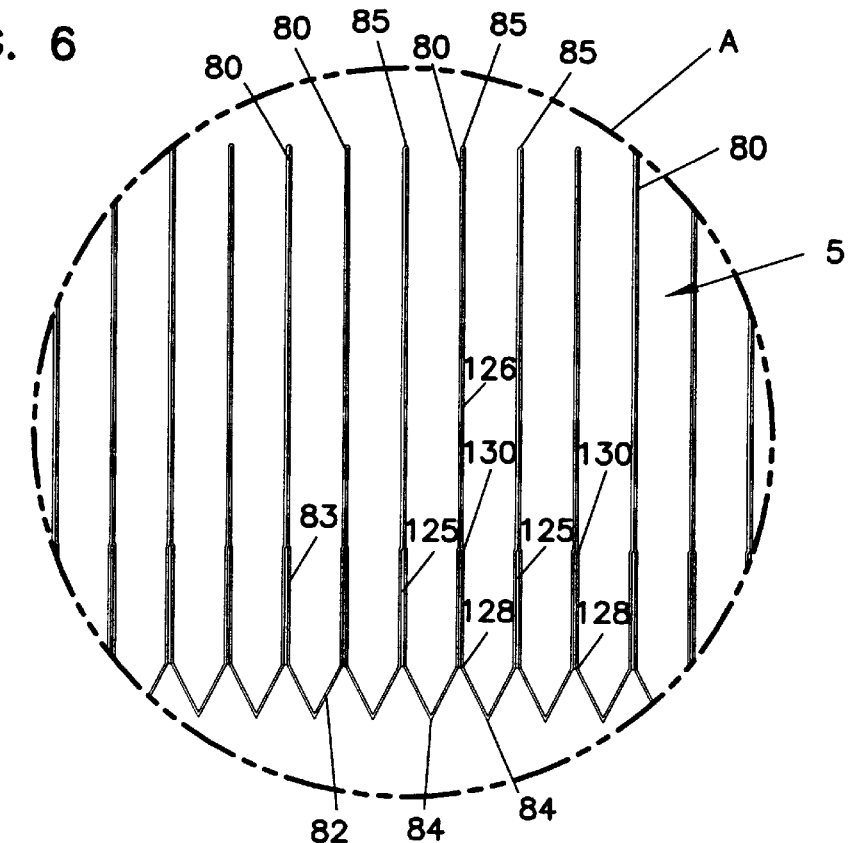
FIG. 6 is an enlarged, fragmentary, schematic view of pleat ends and a pleat bead arrangement, in an assembly according to the disclosure of 08/690,549.
Figure 6A:
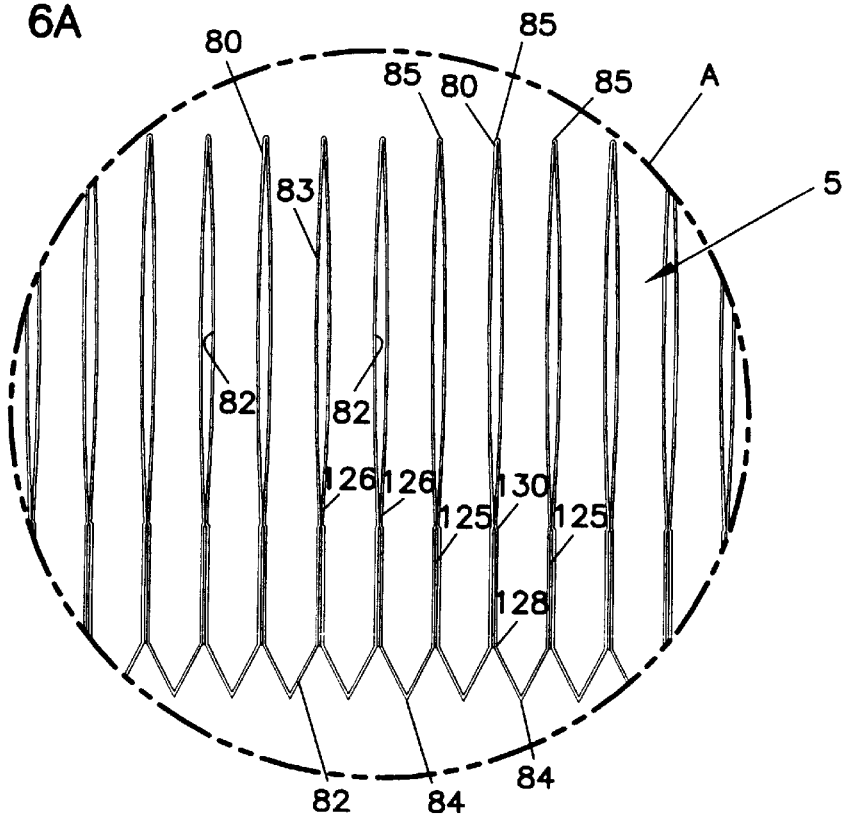
FIG. 6A is a schematic view of the arrangement of FIG. 6, depicting media ballooning, during use.

A first arrangement is shown in FIGS. 6 and 6A. FIGS. 6 and 6A are schematic views. In FIG. 6, media 5 is depicted. The view of FIG. 6 is toward end edge 80 of the media. Upstream pleat tips are depicted at 84; and, corresponding downstream pleat tips are depicted at 85. The media upstream side is at 82 and the downstream side is at 83. The pleat bead arrangement closes at least portions of the various pleats, in regions as defined hereinbelow, to generate desirable effects during operation.

In FIG. 6, a bead of adhesive 125 is shown positioned in each pleat 126 adjacent the upstream tips 84, and on the upstream side 82 of the media 5. Each bead 125 is spaced about 0.25 to 1 inch (0.63–2.54 cm) from the associated upstream pleat tip. Each bead 125 extends about 0.5 inch to 1.5 inches (1.27–3.81 cm) longitudinally, in ridge between ends 128 and 130. Preferably each bead 125 is confined to a region within about 0.25–1.5 inch (0.63–3.81 cm) of the associated media edge 80.

With such a construction, during use, the portion of media between each bead 125 and the associated end 130, can balloon open, FIG. 6A during use, providing greater surface area for efficient filtering. In such an arrangement, the spacer 6 would generally be inserted along the downstream side 83. The ballooning is depicted in FIG. 6A. Each upstream pleat tip, it will be understood, has two associated beads, one at end edge 80, and one at end edge 81, FIG. 5.

Figure 8:
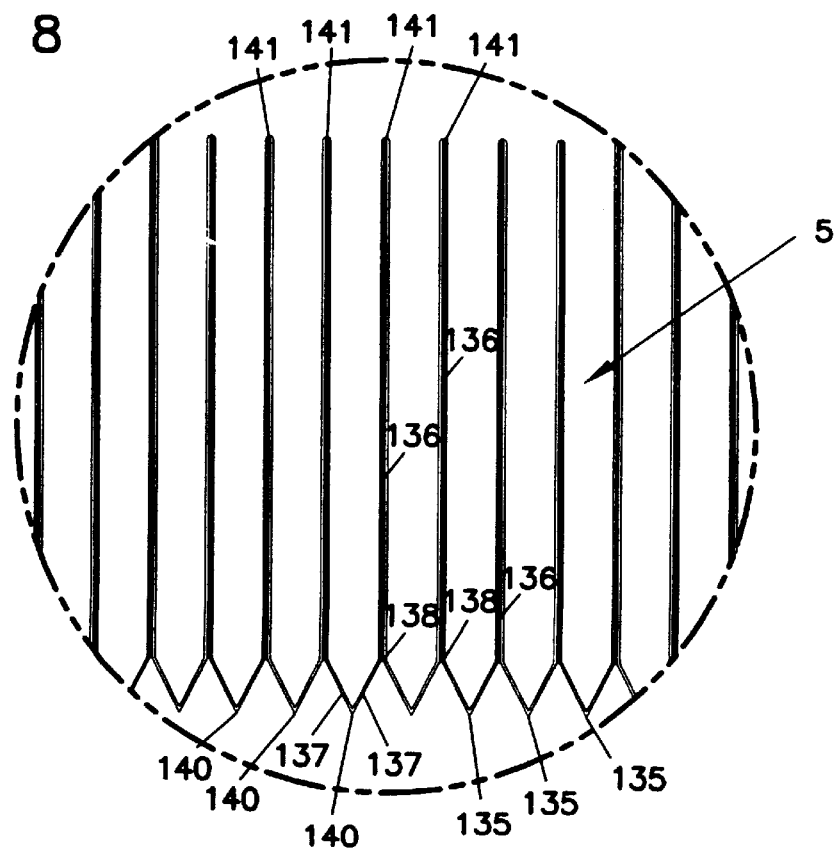
FIG. 8 is a view generally analogous to FIGS. 6, 6A and 7, schematically representing a second alternate pleat bead arrangement useable in an assembly according to the disclosure of 08/690,549.

A second version of a pleat bead arrangement is shown in FIG. 8. For the arrangement of FIG. 8, each pleat 135 includes a bead 136 of sealant position on the upstream side 137 of the media 5, and extending from a point 138 spaced about 0.125 to 1.0 inches (0.32 to 2.54 cm) from the upstream tip 140 completely to an associated downstream tip 141. This is a conventional pleat bead, used in a variety of prior art HVAC systems. Analogously to the arrangement shown in FIGS. 6 and 6A, beads of the type shown in FIG. 8 would be used at each end 80, 81 of each pleat. Of course in use, ballooning or billowing of the type shown in FIG. 6A, at least at the end edges 80, 81, would not occur, since each bead extends all the way to an associated downstream tip.

Figure 7:
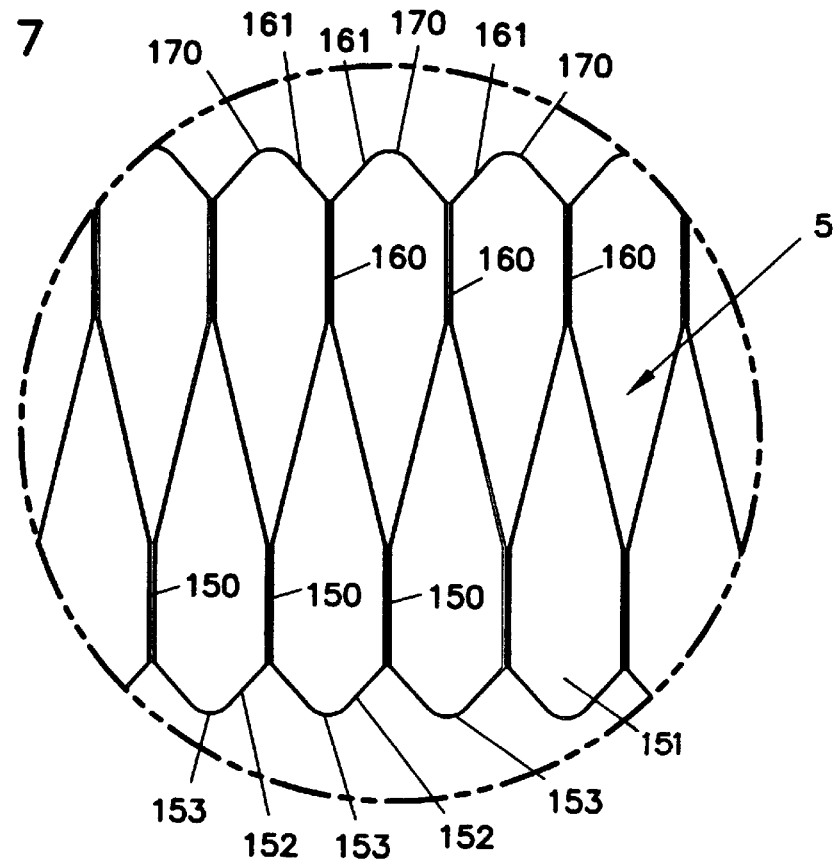
FIG. 7 is the view generally analogous to FIGS. 6 and 6A, schematically representing an alternate pleat bead arrangement useable in arrangements according to the disclosure of 08/690,549.

In FIG. 7 a third alternate arrangement is shown. In FIG. 7, beads 150 identical to beads 125 (FIG. 6) are shown in each pleat 151, on an upstream side 152 of the media 5, and spaced adjacent to the upstream tips 153. Analogous beads 160 are also shown positioned on a downstream side 161 of the media 5 and are similarly spaced from the downstream tips 170.

As a result of the FIG. 7 embodiment, each side 152, 161 can balloon open, in use, as shown in FIG. 7, presenting a large surface area, efficiently, for operation. For the arrangement shown in FIG. 7, the spacer would generally be inserted into the downstream side of the assembly. Also for the arrangement shown in FIG. 7, the upstream and downstream sides of the resulting media would appear the same, but for the positioning of the spacer. This is not true for the arrangements of FIGS. 6, 6A and 8.

Figure 11:
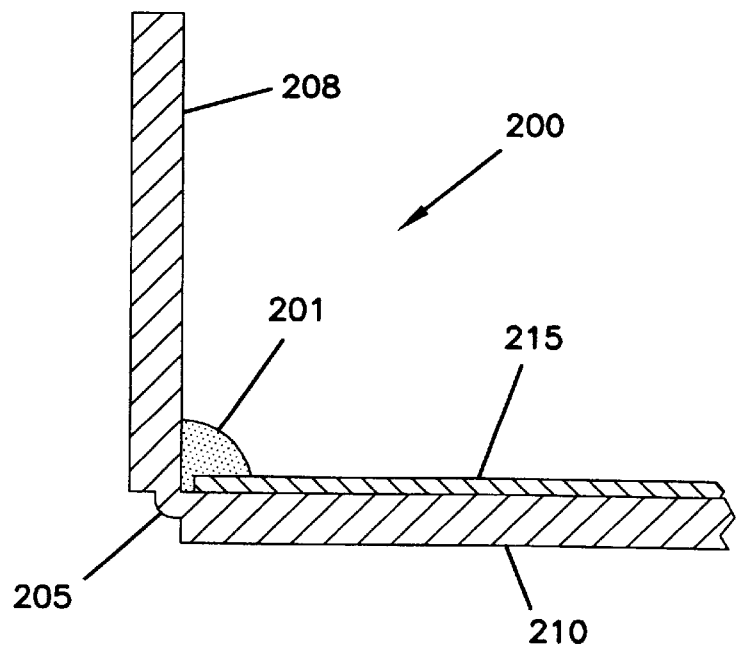
FIG. 11 is a fragmentary cross-section view taken generally along line 11—11, FIG. 1.

Attention is now directed to FIG. 11. In FIG. 11, a fragmentary cross-sectional view taken generally along line 11—11, FIG. 1, is provided for one particular preferred arrangement 200. In arrangement 200, an extension of adhesive 201 is positioned along the inside of each hinge fold 205 between each side flap 208 and the panel 210. This adhesive 201 will serve two purposes. First, it will secure the media 215, to the panel 210. Secondly, it will secure each flap 208, in position, at a right angle preferably, relative to central panel 210. Thus, the flap 208 cannot as readily expand open. This is preferable, since should the flap 208 expand open, it may tend to catch on duct work when being inserted for use, or being withdrawn. A similar line of adhesive would be used at the other hinge fold, for the opposite flap, now shown. A typical adhesive usable for this purpose, is the same adhesive usable for the pleat beads, as defined herein.

It will be understood that although the utilization of adhesive along these hinge lines, between the flap and inner surfaces of the panels which would be adjacent media, are preferred for some arrangements, many advantages according to the disclosure of 08/690,549 can be obtained without the utilization of said extensions of adhesive.

Detailed Disclosure Regarding FIGS. 13–17 and Certain Improvements

FIGS. 13–17 concern certain preferred embodiments, principles and applications. In general, the principles utilized in the embodiments of FIGS. 13–17 are variations of the principles described in the earlier disclosure, i.e., 08/690,549.

Before turning to the arrangements of FIGS. 13–17, a modification in the arrangement of FIG. 12, relative to the version shown in the disclosure of 08/690,549 will be mentioned. In particular, turning to FIG. 12, flaps 23 and 43 are now shown to include therein notches 200. Notches 200 can be used to indicate a proper position for insertion of spacers 6 and 7. Two sets of two notches 200 are shown. Of course, if the arrangement is sufficiently large to require three spacers, two sets of three notches 200 can be used. The notches 200 can be die-cut when preferred paperboard materials are utilized for the side flaps 23 and 43. Again, they may be used to facilitate assembly, by providing an indication of the proper location for alignment of the pleat spacers 6 and 7.

FIGS. 13–17

Figure 13:
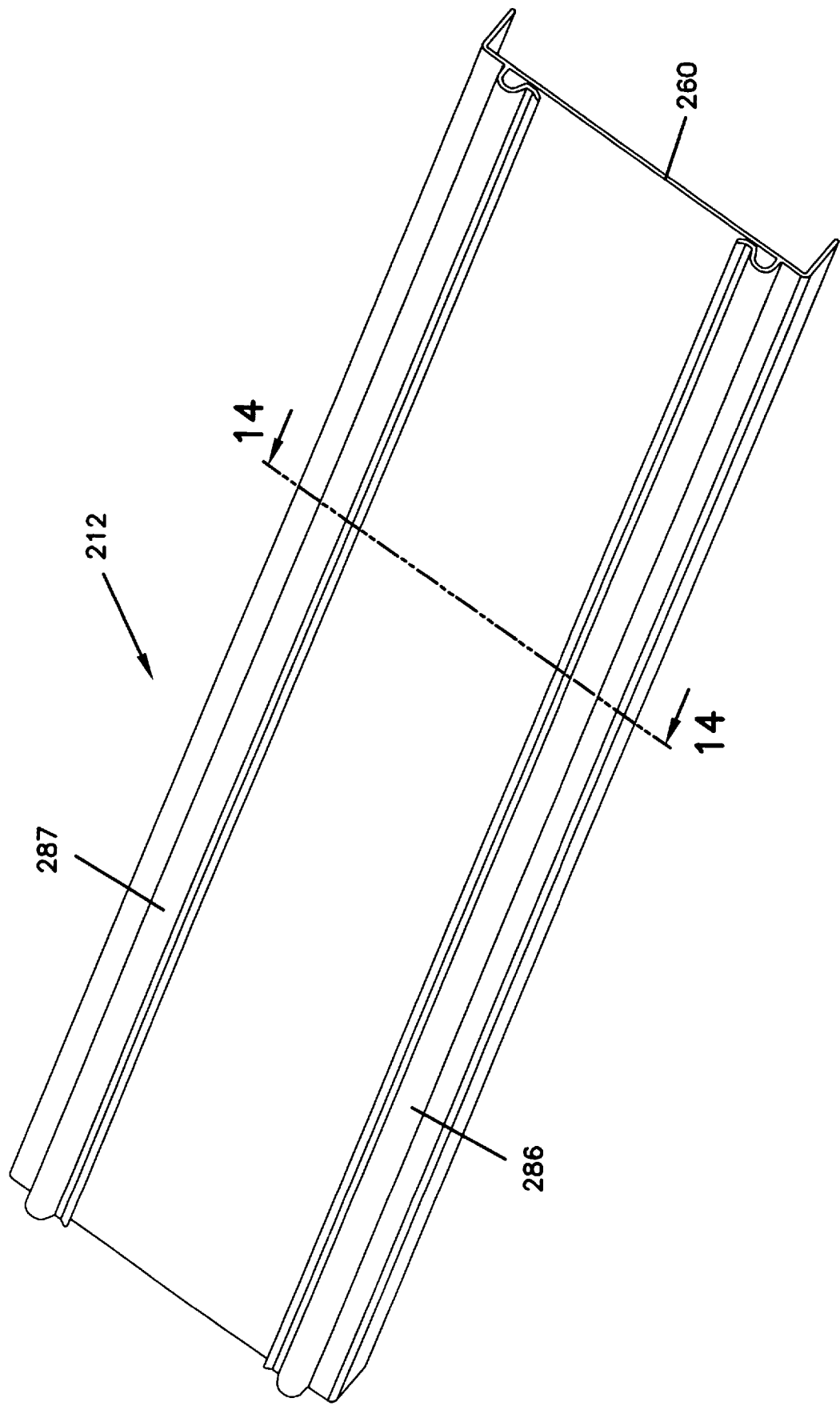
FIG. 13 is a perspective view of an alternate frame member.
Figure 14:
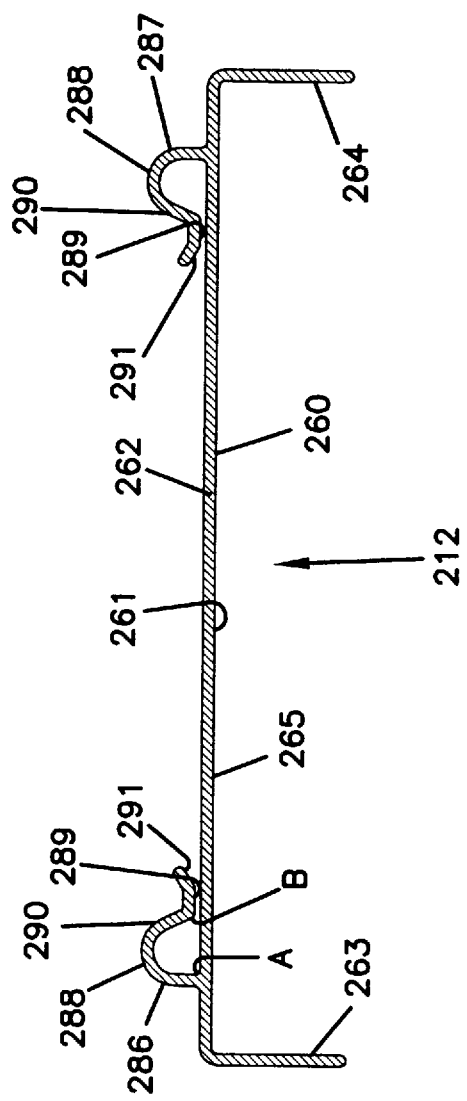
FIG. 14 is a cross-sectional view of the frame member shown in FIG. 13, taken generally along line 14—14 thereof.
Figure 15:
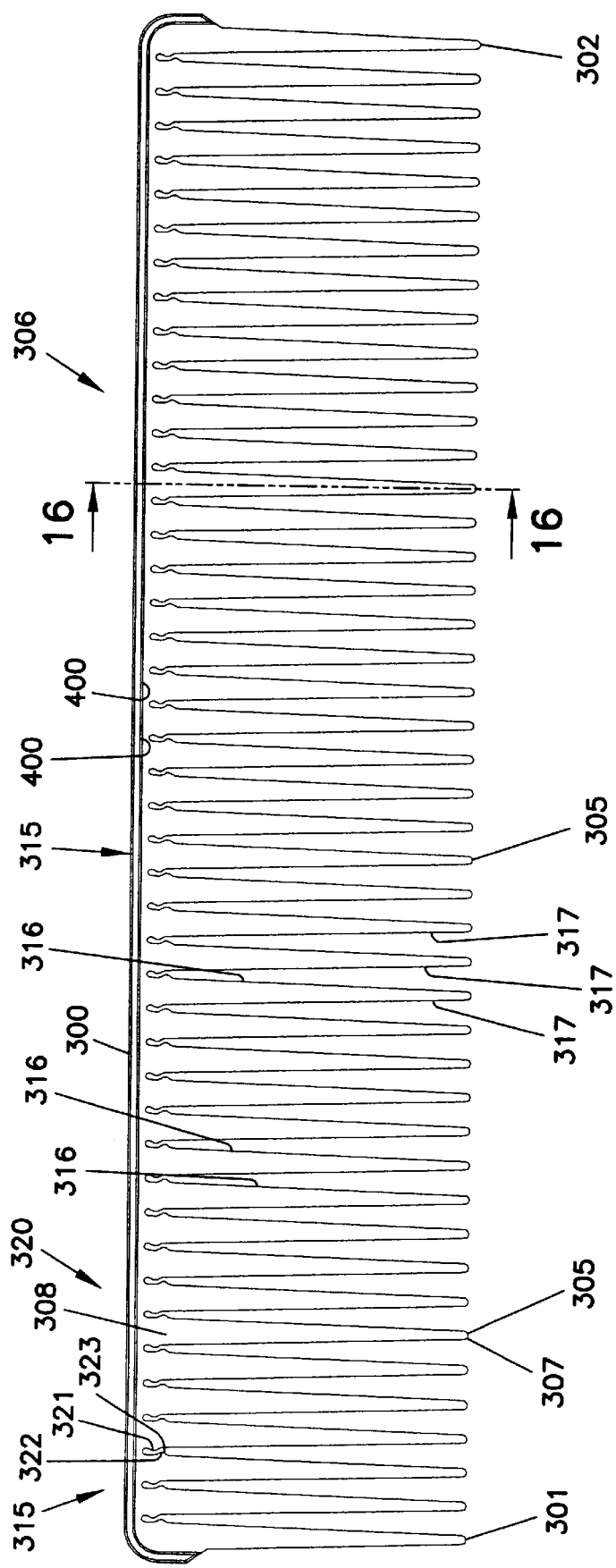
FIG. 15 is a top plan view of an alternate spacer.
Figure 17:
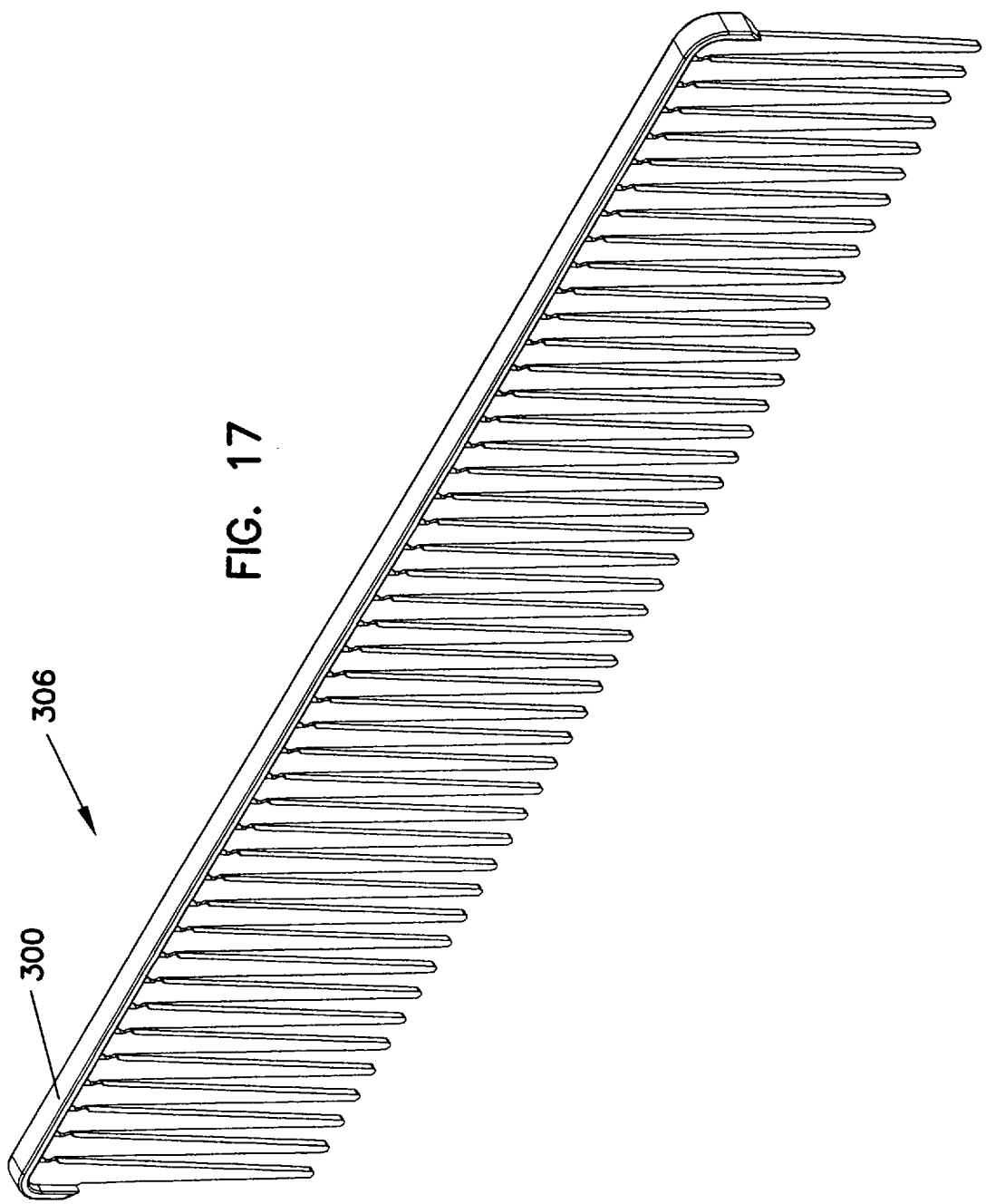
Figure 16:
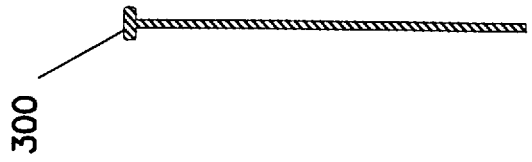
FIG. 16 is a cross-sectional view of the spacer shown in FIG. 15, taken along line 16—16 thereof; and, FIG. 17 is a perspective view of the pleat spacer shown in FIG. 15.

In FIGS. 13 and 14, a preferred frame member is disclosed. In FIGS. 15–17, a preferred pleat spacer is presented.

Referring first to FIGS. 13 and 14, frame member 212 comprises a center member 260 having an inside surface 261 and an outside surface 262. As with the arrangement 12 shown in FIGS. 1 and 3, the inside surface 261 is bordered on first and second opposite sides by longitudinal side members or edge members 263 and 264. Thus, surface 261 and side members 263, 264 form a trough 265 which, in use, receives an end edge of media during assembly, similarly to frame member 12, FIGS. 1–3.

As with frame member 12, preferably frame member 212 is constructed such that the only projections it has, extending outwardly from inside surface 261, are the two side members 263, 264. That is, preferably the trough 265 is defined by flat surface 261 bordered by side members 263, 264 without other projections therein. This will generally facilitate assembly and use. It is also a construction that can be readily made using extrusion techniques, as was member 12 of FIGS. 1 and 3. Thus, it can similarly be extruded from various materials such as plastic or metal, for example an extrudable polymer or extruded aluminum.

As with the frame member 12 of FIGS. 1 and 5, frame member 212 includes, extending from surface 60 thereof, projections 286 and 287, FIG. 14. In cross-section, projections 286 and 287 differ significantly, from the arrangements 86 and 87 of FIGS. 1 and 5.

Referring to FIG. 14, projections 286 and 287 are each elongate rail members. Each has an elongate, curved, spring shoulder or extension 288 and a depending rail surface 289. The depending rail surfaces 289 are supported in a position spaced from surface 262, by extensions 290. The curved spring extensions 288 are oriented with concave sides thereof directed toward surface 262.

Preferably the tolerance in the gap between rails 289 and surface 262 is, nominally, at least about 30%, generally not more than 90%, typically 40% to 60%, and preferably about 50% of the thickness of an end tab such as tabs 20 and 40, FIG. 1, to be received over surface 262 in use. For preferred arrangements in which the end tabs 20 or 40 have a thickness of about 0.040 to 0.080 inch, preferably the gap between rails 289 and surface 262 is about 0.020 to 0.040, most preferably about 0.030 of an inch. By "nominally" in this context, reference is meant to the gap when projections 286 and 287 are neither under compression nor expansion, but rather are at rest for the memory of the material from which member 212 is extruded.

Preferably each projection 286, 287, has an inner, upwardly turned inner flange 291 thereon. By "upwardly" in this context, a direction outwardly from surface 262 is meant.

It is apparent, then, that in use that frame member 212 would operate similarly to member 12, FIGS. 1–12, except that, as a result of the shape of projections 286 and 287, some spring pressure or clamping pressure (force) is applied to securing the tabs 40, 20 of end panels on the associated filter member, in place. That is, due to the shape illustrated in FIGS. 13 and 14, projections 286 and 287 operate as spring clamps, to clamp in place, and securely hold, a portion of an end panel received in the gaps between rails 289 and surface 262. A preferred configuration for projections 286 and 287 is illustrated in FIG. 14, and is described in greater detail hereinbelow.

In other manners, the arrangement of FIGS. 13 and 14 may be utilized analogously to the frame member 12 described in connection with FIGS. 1–12.

In FIGS. 15, 16 and 17, a preferred pleat spacer 306 is shown. Analogously to spacer 6, spacer 306 comprises a comb-like configuration, with a longitudinal ridge 300 having end fingers 301 and 302, respectively. Projecting outwardly from the longitudinal ridge 300, evenly spaced between end fingers 301 and 302, are central pleat spacing fingers 305. Each one of fingers 305 tapers from a base region 308 to a tip 307, preferably along generally straight edges, to conveniently project between adjacent pleats and to retain same spread open. Preferably, the spacer 306 is sized and configured to have three less fingers (301, 302 and 305) than the number of spaces between pleats 15, FIG. 1, on the upstream side of the construction 1. This would be analogous to spacers 6 and 7, described with respect to previous figures.

For the preferred arrangement, the spacer 306 would not include a finger projecting into the very end pleats, to spread them open. This is because each end pleat is positioned underneath one of the side flaps in use, as described above in connection with spacer 6.

Spacer 306 includes a securing arrangement thereon for securing the spacer 306 to the media pleats. The preferred arrangement for securing generally comprises a convenient media pinch arrangement 315. Analogously to the spacer 6, each finger 301, 302 and 305 is formed from edges 317 and 316. In the region adjacent longitudinal extension 300, adjacent 316, 317 of adjacent fingers, converge toward one another, to form a bite or pinch arrangement 320. Referring to FIG. 15, to facilitate the pinch, a pair of beads 321, 322 are associated with each pinch, and longitudinally spaced from one another, along the extended length to the associated fingers, to form a generally s-shaped channel 323. For the arrangement shown in FIG. 15, there is an s-shaped channel 323 associated with the bite between each and every pair of adjacent fingers. This is different than the arrangement 6, depicted in FIG. 10.

Of course, as with the arrangement 6 of previous figures, the "s-shaped" channel of FIG. 15 could be a reverse "s", and indeed would be viewed as a reverse "s" from the opposite side. The same manner of pinch will occur, whether the "s" configuration is a forward "s" or a reverse "s". Herein the term "s-shaped" is intended to refer to both. Preferred radii for projections 321 and 322, are described hereinbelow.

It should be apparent that members according to FIGS. 13–17 can be utilized in arrangements otherwise generally as described in FIGS. 1–12, to advantage. Preferred frame members 212, provide for an even more secure clamping than the arrangement 12 of FIGS. 1–12; and, the pleat spacer 306 of FIGS. 15–17 provides for relatively secure attachment to nearly every pleat. For such preferred arrangements, as with the arrangement shown in FIGS. 1–12, the extruded members 312 are conveniently configured and in the overall configuration, do not even engage one another or directly touch one another. That is, the two oppositely positioned frame members are spaced apart, by the media.

Some Preferred Constructions and Materials Disclosed in 08/690,549

Consider an HVAC system in a building, which is designed to be operated with an intake flow of about 1400 cfm to 2200 cfm. Such a system, for example, may comprise a commercially available Honeywell F25 housing, which uses permanent ductwork sized and configured to receive a filter assembly of about 20 inches by 25 inches, and 5 inches deep, slid into and out of a receiver system.

For such an arrangement, a preferred new filter assembly or construction according to the disclosure of 08/690,549 would be as follows:

The filter media can comprise any media usable for HVAC systems, and there is no media preference with respect to the principles of the disclosure of 08/690,549, as long as the media is of appropriate integrity and thickness to be positioned where needed, and to support the spacers without tearing. A usable media is Hollingsworth and Vose FM 2155 available from Hollingsworth & Vose, East Walpole, Mass. 02032. The media would generally comprise a sheet about 18.9 inches by 480 inches, folded into about 48 pleats, with a pleat depth of 5 inches.

The end panels 10, 11 for such an arrangement would be formed from paperboard or cardboard. A usable material is 40–80 thousandths of an inch (0.1 to 0.2 cm) thick clay coated newsback, such as 60,000ths of an inch thick clay coated newsback available from Packaging Technologies Inc.

The paperboard would preferably be appropriately die-cut or scored, to provide for the end tabs and side flaps, hingedly secured, as illustratedly in FIG. 1. The central panel for each end panel would be about 19.04 inches by 5 inches; the end tabs would be about 2 inches by 4.27 inches; and the side flaps would be about 0.75 inch by 18.9 inches each. Preferably each score or die-cut is cut about 50% (30–70%) of the way through the paperboard; i.e., the die-cuts are used to form hinges about 20 to 40 thousandths of an inch thick.

Preferably the outer corners of each tab are cut beveled, as illustrated in FIG. 5 at 202, to facilitate assembly.

Frame members 12 and 13 for the arrangement would generally be configured in cross-section as illustrated in FIG. 4. Preferably each frame member is extruded material such as plastic or metal, for example a commercial PVC extruded to about 60–90 thousandths (inch) thick is usable. The frame members would be sized to fit the receiving boot in the duct work, and to support the expanded element.

Each comb member or spacer (6, 7) preferably is a molded plastic member, for example, a conventional fire retardant ABS plastic. Preferably each finger is about 4.69 inches long, extending from a 0.25 inch wide central ridge. Each bead, to form the media pinch, is preferably formed on a radius of 0.09 inch.

For the most preferred arrangement, the option illustrated in FIGS. 6 and 6A is used for the bead seals in each pleat. Preferably a hot melt adhesive is used as the bead adhesive, and each bead is about 1.0 inch long and is positioned to start at a distance of about 0.5 inch from the upstream tip of each upstream pleat. A preferred hot melt adhesive is a polyamid hot melt adhesive such as Henkel 6238, available from Henkel Corp., LaGrange, Ill. 60525.

Preferably the media is secured to the panels by the same adhesive, using the configuration of FIG. 11.

Analogous materials can be utilized to provide HVAC panel arrangements of a wide variety of sizes, typically about 16 inches to 20 inches by 20 inches to 25 inches. Such sizes should be useful in HVAC systems having demands of about 1400–2200 cfm. Typically, fireproof or fire resistant materials will be preferred.

Some Preferred Constructions of Materials Concerning Arrangements Such As Those Described in FIGS. 13–17

When the frame member is a frame member such as member 212, FIG. 13 or 14; and, it is desired to prepare the arrangement by extruding plastic, a preferred plastic has been identified. The plastic is a PVC type of plastic commercially available under the designation Geon 8700X 288, black, available from Geon Co., Avon Lake, Ohio 44012. When the pleat spacer is a spacer according to the arrangement shown at 306, FIGS. 16–17, and it is desired that it be molded from plastic, a preferred plastic has been identified. The plastic is an injection-molded ABS, using a raw material available under the trade designation Polylac 765, black, flame retardant. The material is available from Chi Mei Industrial Co., Taipei, Taiwan, through U.S. distributor Entec Polymers, Ft. Myers, Fla. 33907.

As indicated above, when a preferred end panel thickness of about 0.060 inch is used, preferably the "gap" for the spring plates 286, 287 between rails 289 and surface 262, is nominally about 0.030 of an inch, with a tolerance of ±0.010 of an inch. Preferably the radius of curvature for sections 288, FIG. 14, is within a range of 0.17 to 0.19, preferably about 0.18 inch outside; and, preferably the width (transverse direction) of rail surfaces 289 is about 0.1 inch. Preferably, the distance between points A and B, FIG. 14, is about 0.4 inch; and, preferably rails 268 and 287 are extruded as mirror images of one another and, as shown in FIG. 13, each extends the entire length of the associated frame member 212. Preferably the frame member is about 0.06 inch thick.

Turning now to the pleat spacer 306 in FIGS. 15–17, preferably each bead 321, 322 is molded to a radius of about 0.09 inch and the centers are spaced, longitudinally, about 0.12 inch apart. Preferably the radius of each end 400, FIG. 15, is about 0.05 inch.

Preferably the width of rail 300 is about 0.395 inch, with each finger about 0.095 inch thick; the width of rail 301 and the fingers being the transverse directions depicted by the cross-section in FIG. 16.

It has been found that it is preferred that rail 300 be relatively straight, when the spacer 306 is assembled in a filter assembly, as described. To facilitate this, it is understood that after a molding process is done, but while the arrangement 306 is cooling, it may be desired to hold the arrangement in a slight bow, so that surface 300 is retained slightly convex. An observation has been made that when the arrangement completely cools under such circumstances, a somewhat straighter edge 300 results. While the reasons for this are not fully understood, it appears to relate to the manner in which the preferred material for molding spacer 306 cools, and minor adjustments in the configuration of region 300, as the cooling occurs.

It is foreseen, as discussed above, that principles according to the disclosure of 08/690,549 may also be applied in cabin air filters for vehicles.

What is claimed is:

1. A filter assembly comprising:
   (a) first and second, opposite, separate frame members;
      (i) each frame member comprising an elongate extension having first and second sides;
   (b) a filter element removably and replaceably secured to said first and second frame members; said filter element comprising:
      (i) a filter media member; and,
      (ii) first and second, opposite, end panels; said filter member being secured in extension between said first and second end panels;
         (A) each one of said first and second end panels having first and second engagement portions hingedly secured thereto:
   (c) each frame member having a filter element panel engagement arrangement on a side thereof opposite from a side directed toward said filter media member; and
   (d) said filter element being releasably secured to said first and second, opposite, frame members, by selected engagement between said engagement portions of said end panels and said panel engagement arrangement of each frame member; and said filter element being selectively removable and replaceable from said first and second frame members by selected disengagement between said engagement portions of said end panels and said panel engagement arrangement of each frame member.

2. A filter assembly according to claim 1 wherein:
   (a) each filter panel engagement arrangement comprises a pair of projections constructed and arranged to form receiving slots for selected portions of said end panels.

3. A filter assembly according to claim 2 wherein:
   (a) said engagement portions of said end panels includes on each of said end panels first and second, opposite, end tabs hingedly secured therein; and,
   (b) each filter panel engagement arrangement comprises a pair of longitudinal rails, positioned on a side of each frame member elongate extension, sized and configured to receive a selected portion of one end tab from each end panel thereunder, during assembly.

4. A filter assembly according to claim 3 wherein:

(a) each longitudinal rail, of each filter panel engagement arrangement, is sized and configured to apply a clamping pressure to a selected portion of each end tab positioned thereunder, during assembly.

5. A filter assembly according to claim 4 wherein:
   (a) each frame member comprises an elongate extrusion.

6. A filter assembly according to claim 5 wherein:
   (a) each frame member comprises an elongate plastic extrusion.

7. A filter assembly according to claim 4 wherein:
   (a) said filter media member is pleated and includes at least one pleat spacer therein.

8. A filter assembly according to claim 7 wherein:
   (a) each pleat spacer comprises a molded plastic spacer.

9. A filter assembly according to claim 4 wherein:
   (a) each longitudinal rail comprises a clamping surface spaced, nominally, from a second side of an associated one of said frame members, by a first distance; and,
   (b) each end tab has a first thickness;
      (i) said first distance being within a range of 30% to 70% of said first thickness.

10. A filter assembly according to claim 9 wherein:
    (a) each clamping surface of each longitudinal rail is secured with an associated frame member by an elongate, curved, spring extension.

11. A filter assembly according to claim 10 wherein:
    (a) said elongate, curved, spring extension has a curvature with a radius of 0.17 to 0.19 inch.

12. A pleat spacer comprising:
    (a) a molded, plastic, comb having a plurality of pleat spacing fingers projecting outwardly therefrom;
    (b) a media pincher positioned between each pair of adjacent fingers in said pleat spacer;
       (i) each media pincher comprising a pair of beads forming an s-shaped media bite; said media pincher being constructed and arranged to provide for gripping of filter media when selectively positioned in contact with filter media.

13. A frame member for a filter assembly; said frame member comprising:
    (a) an elongate, extruded, extension having first and second, opposite, sides and first and second opposite edges;
       (i) said extension having first and second, opposite, side edge members, projecting outwardly from said first side of said frame member, to form a trough; and
       (ii) said frame member including a pair of longitudinal rails spaced a distance from said first and second opposite edges and positioned in projection outwardly from said second side of said frame member; each rail including a clamping surface secured within said frame member by an elongate, curved, spring extension.

14. A frame member according to claim 13 wherein:
    (a) said elongate, curved, spring extension has a radius within the range of 0.17 to 0.19 inch.

15. A frame member according to claim 14 wherein:
    (a) said clamping surface, of each rail, is spaced, nominallym from said second side a distance within the range of 0.020 to 0.040 inches.

16. A frame member according to claim 13 wherein:
    (a) said clamping surface, of each rail, is spaced, nominally, from said second side a distance within the range of 0.020 to 0.040 inches.

* * * * *